US008327085B2

(12) United States Patent
Anand et al.

(10) Patent No.: US 8,327,085 B2
(45) Date of Patent: Dec. 4, 2012

(54) CHARACTERIZING MULTIPLE RESOURCE UTILIZATION USING A RELATIONSHIP MODEL TO OPTIMIZE MEMORY UTILIZATION IN A VIRTUAL MACHINE ENVIRONMENT

(75) Inventors: Vaijayanthimala K. Anand, Austin, TX (US); Richard Louis Arndt, Austin, TX (US); David Alan Hepkin, Austin, TX (US); Sergio Reyes, Austin, TX (US); Kenneth Charles Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 12/774,352

(22) Filed: May 5, 2010

(65) Prior Publication Data
US 2011/0276742 A1    Nov. 10, 2011

(51) Int. Cl.
*G06F 12/00* (2006.01)
*G06F 13/00* (2006.01)
*G06F 9/46* (2006.01)
*G06F 1/24* (2006.01)
*G06F 9/00* (2006.01)

(52) U.S. Cl. . 711/153; 711/154; 711/170; 711/E12.002; 718/104; 713/100

(58) Field of Classification Search .................. 711/153, 711/154, 170, E12.002; 718/104; 713/100
See application file for complete search history.

(56) References Cited

U.S. PATENT DOCUMENTS

| 4,525,778 | A | 6/1985 | Cane .............................. 711/207 |
|---|---|---|---|
| 5,321,836 | A | 6/1994 | Crawford et al. ............. 711/206 |
| 7,296,265 | B1 | 11/2007 | Krishnan et al. .............. 711/166 |
| 7,475,183 | B2 | 1/2009 | Traut et al. ......................... 711/6 |
| 2005/0267948 | A1 | 12/2005 | McKinley et al. ............ 709/217 |
| 2006/0062148 | A1 | 3/2006 | Ajiro et al. ..................... 370/232 |
| 2008/0126622 | A1 | 5/2008 | Tamir et al. ..................... 710/52 |
| 2008/0134178 | A1* | 6/2008 | Fitzgerald et al. ................ 718/1 |
| 2008/0140960 | A1 | 6/2008 | Basler et al. ................... 711/162 |
| 2009/0150640 | A1* | 6/2009 | Royer et al. ................... 711/173 |
| 2009/0204718 | A1 | 8/2009 | Lawton et al. ................ 709/230 |

OTHER PUBLICATIONS

Padala, et al., "Performance Evaluation of Virtualization Technologies for Server Consolidation", HP Laboratories, Palo Alto, Apr. 11, 2007, 15 pages.

* cited by examiner

*Primary Examiner* — Edward Dudek, Jr.
(74) *Attorney, Agent, or Firm* — VanLeeuwen & VanLeeuwen; Matthew W. Baca (57) ABSTRACT

An approach is provided that uses a hypervisor to allocate a shared memory pool amongst a set of partitions (e.g., guest operating systems) being managed by the hypervisor. The hypervisor retrieves memory related metrics from shared data structures stored in a memory, with each of the shared data structures corresponding to a different one of the partitions. The memory related metrics correspond to a usage of the shared memory pool allocated to the corresponding partition. The hypervisor identifies a memory stress associated with each of the partitions with this identification based in part on the memory related metrics retrieved from the shared data structures. The hypervisor then reallocates the shared memory pool amongst the plurality of partitions based on the identified memory stress of the plurality of partitions.

17 Claims, 6 Drawing Sheets

CHARACTERIZING MULTIPLE RESOURCE UTILIZATION USING A RELATIONSHIP MODEL TO OPTIMIZE MEMORY UTILIZATION IN A VIRTUAL MACHINE ENVIRONMENT

BACKGROUND OF THE INVENTION

In computing, a hypervisor, also called virtual machine monitor (VMM), allows multiple partitions, such as guest operating systems, to run concurrently on a host computer. The hypervisor presents the guest operating systems with a virtual platform and monitors the execution of the guest operating systems. In that way, multiple operating systems, including multiple instances of the same operating system, can share hardware resources. Unlike multitasking, which also allows applications to share hardware resources, the virtual machine approach using a hypervisor isolates failures in one operating system from other operating systems sharing the hardware. With Advanced Memory Sharing, the hypervisor shares memory from a memory pool amongst the guest operating systems. In traditional approaches, the hypervisor receives limited information from the guest operating systems. This limited information can cause the hypervisor to incorrectly determine that a partition does not need as much memory, or needs more memory, because of the limited, and sometimes misleading, data metrics traditionally used with Advanced Memory Sharing.

SUMMARY

An approach is provided that uses a hypervisor to allocate a shared memory pool amongst a set of partitions (e.g., guest operating systems) being managed by the hypervisor. The hypervisor retrieves memory related metrics from shared data structures stored in a memory, with each of the shared data structures corresponding to a different one of the partitions. The memory related metrics correspond to a usage of the shared memory pool allocated to the corresponding partition. The hypervisor identifies a memory stress associated with each of the partitions with this identification based in part on the memory related metrics retrieved from the shared data structures. The hypervisor then reallocates the shared memory pool amongst the plurality of partitions based on the identified memory stress of the plurality of partitions.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
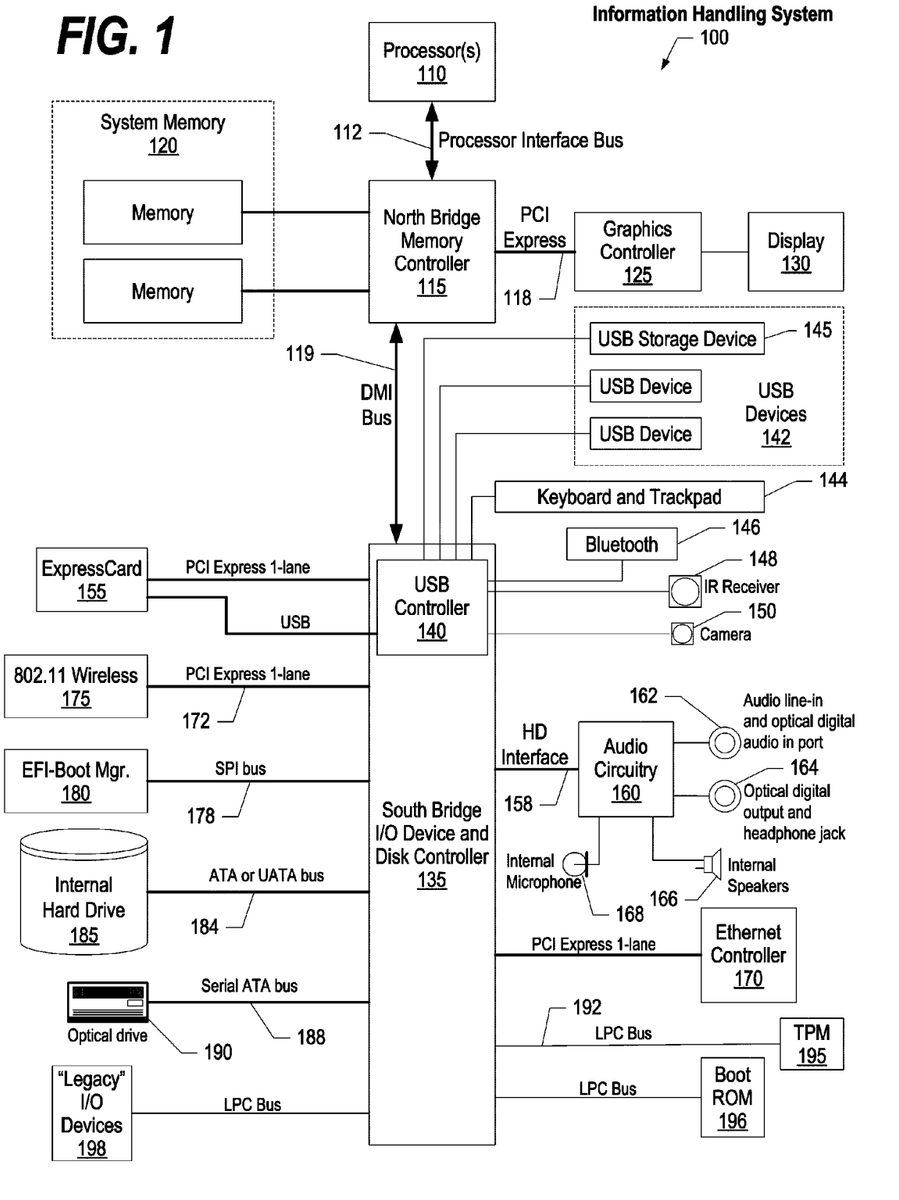
FIG. 1 is a block diagram of a data processing system in which the methods described herein can be implemented.
Figure 2:
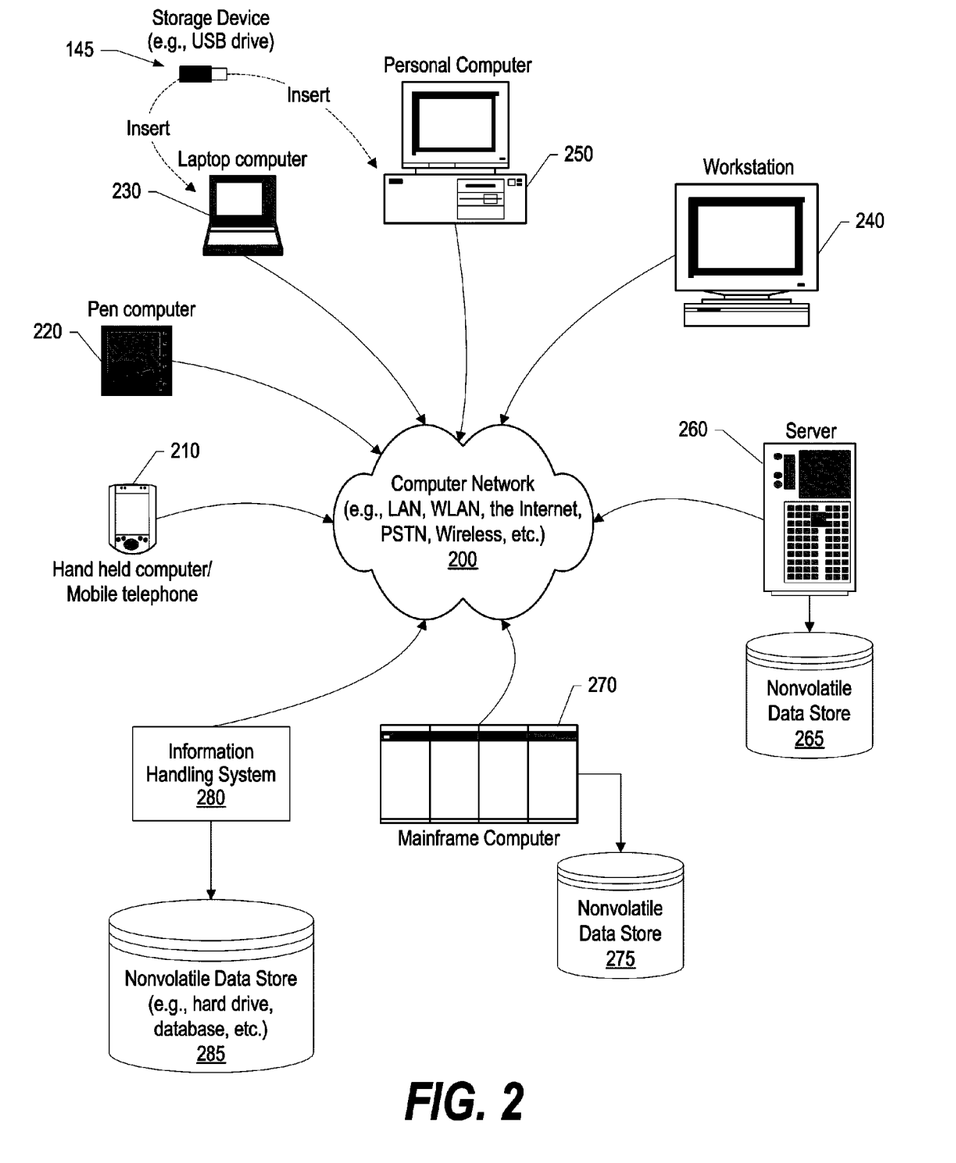
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Extensible Firmware Interface (EFI) manager 180 connects to Southbridge 135 via Serial Peripheral Interface (SPI) bus 178 and is used to interface between an operating system and platform firmware. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, mobile internet device, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
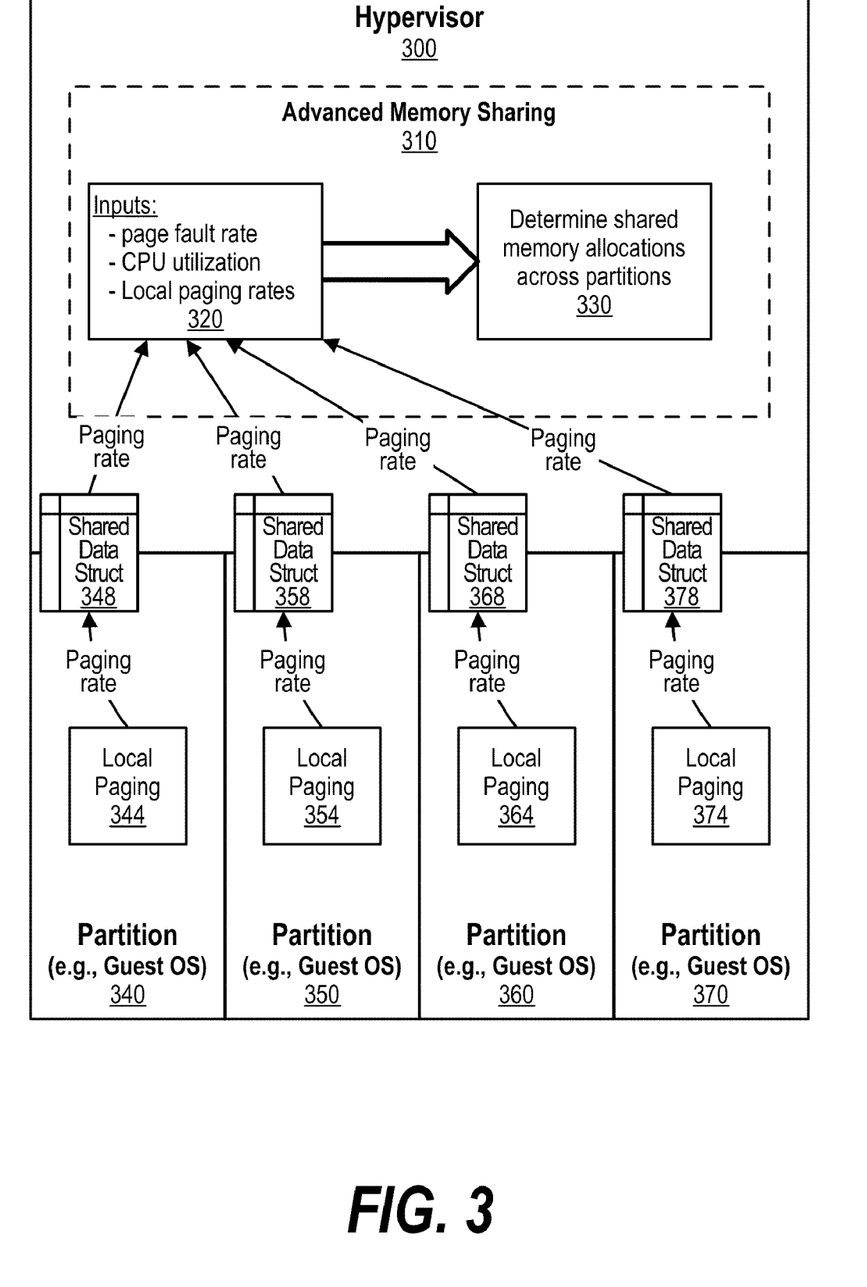
FIG. 3 is a diagram depicting various partitions communicating paging rates to the hypervisor using shared data structures.

FIG. 3 is a diagram depicting various partitions communicating paging rates to the hypervisor using shared data structures. Hypervisor 300 is executed by one or more processors (e.g., processor(s) 110 shown in FIG. 1). Hypervisor 300 manages a memory pool (e.g., memory allocated in system memory 120 shown in FIG. 1) which is shared by the hypervisor as well as one or more partitions. In FIG. 3, hypervisor implements Advanced Memory Sharing 310 and uses various system values (inputs 320) to determine how the memory pool is allocated amongst the various partitions (determination step 330). The hypervisor has access to certain system values, such as the page fault rate and CPU utilization amongst the various partitions, however some memory related metrics are localized within partitions. One example of a localized memory related metric is a local paging rate (re-paging rate) that measures the local paging performed by a particular partition. In order to provide these localized memory related metrics, a shared data structure is established between the partitions and the hypervisor. When a partition performs a memory related function, such as a local paging operation, the partition updates the shared data structure. Periodically, hypervisor 300 performs the Advanced Memory Sharing operation during which the hypervisor determines a memory stress associated with each of the partitions using the various inputs, including the memory related metric stored in the shared data structure. The hypervisor then uses the memory stress associated with each of the partitions to allocate (or re-allocate) the memory pool amongst the various partitions in order to give additional memory to those partitions that are identified as more-memory stressed and take memory away from those partitions that are identified as non- (or less-) memory stressed.

In the example shown in FIG. 3, four partitions (e.g., guest operating systems, etc.) are being managed by hypervisor 300. These partitions include partitions 340, 350, 360, and 370. Each of these partitions perform local memory related functions, such as local paging operations (local paging processes 344, 354, 364, and 374, respectively). When these local memory related functions are performed, the partitions each update their respective shared data structures (shared data structures 348, 358, 368, and 378, respectively). For example, with a local paging function being the memory related operation, each time the local paging function is performed (e.g., each time a page of memory brought in from disk by the partition), then the partition updates its respective shared data structure (e.g., incrementing a counter, etc.). When the hypervisor periodically reads the shared data structures, it can identify differences (deltas) between the current counter value and the last time the hypervisor read the value. For example, if shared data structure 348 was incremented one hundred times in an interval, while data structure 358 was only updated three times during the same interval, then the hypervisor can ascertain that partition 340 is having to perform many more local paging operations than partition 350 and, therefore, partition 340 is likely more memory-stressed than partition 350. In this example, it may make sense to reallocate the memory pool and allocate more memory to partition 340 and less memory to partition 350.

Figure 4:
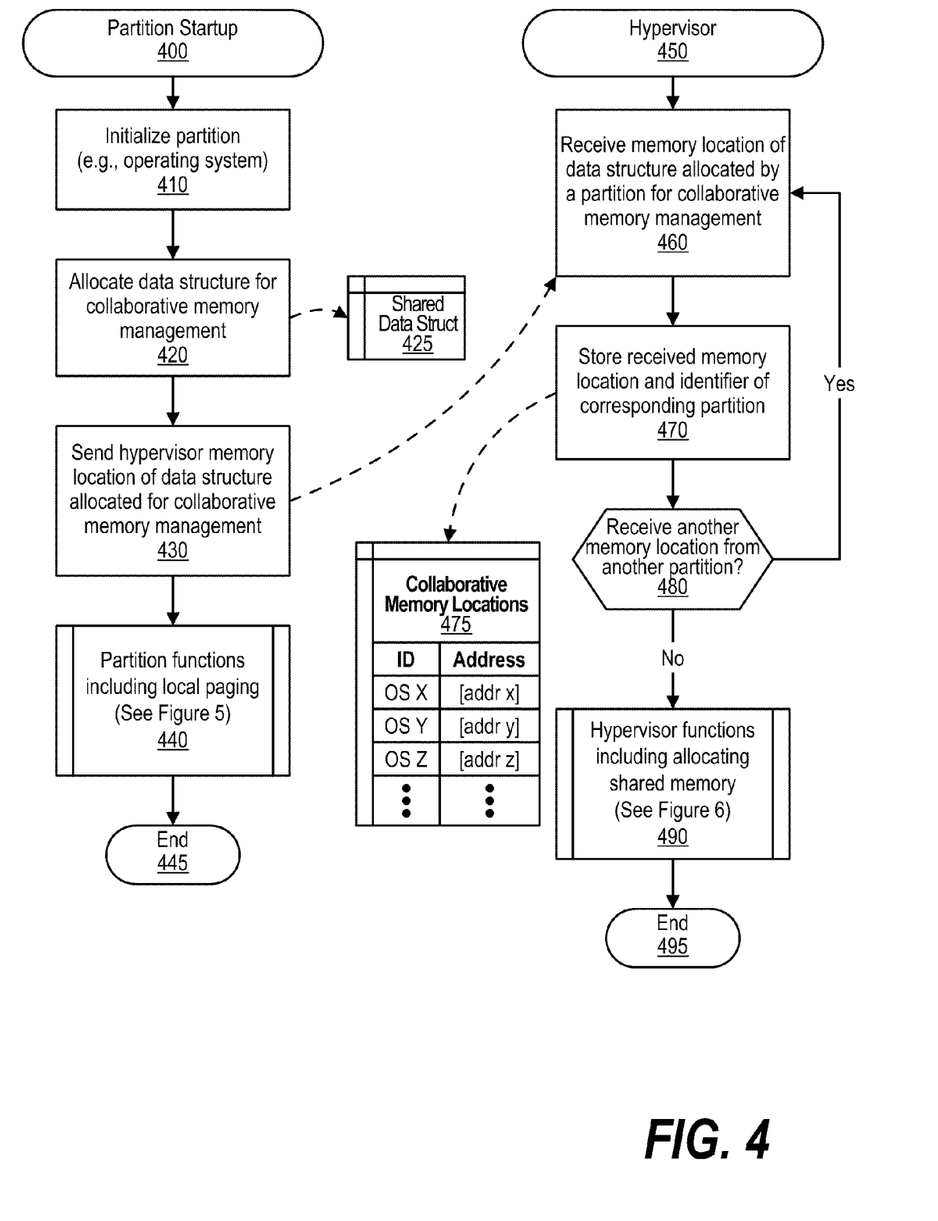
FIG. 4 is a high level flowchart showing the initialization of the shared data structures by the partitions and communication of the shared data structure addresses to the hypervisor.

FIG. 4 is a high level flowchart showing the initialization of the shared data structures by the partitions and communication of the shared data structure addresses to the hypervisor. Partition startup processing commences at 400 whereupon, at step 410, the partition (such as a guest operating system) performs its initialization processing (e.g., boot process, etc.). At step 420, the partition allocates shared data structure 425 which will be used for collaborative memory management and will be used to store memory related metrics local to this partition (e.g., local paging metrics, etc.). At step 430, the partition sends the hypervisor the location (memory address) of shared data structure 425. After the partition has performed its startup functions, at predefined process 440, the partition performs its regular functions including local memory related operations (e.g., local paging operations). See FIG. 5 and corresponding text for processing details related to partition operation and communication of local memory related metrics. Partition processing thereafter ends at 445.

Hypervisor functions are shown commencing at 450 whereupon, at step 460, the hypervisor receives a memory location (memory address) from one of the partitions that the hypervisor is managing. At step 470, the hypervisor stores the memory location received along with an identifier that identifies which partition owns this shared data structure. Hypervisor manages collaborative memory locations 475 which, as shown, is used to store the partition identifier along with the shared data structure memory address. A determination is made as to whether another partition is sending the hypervisor another memory location that is used for collaborative memory management (decision 480). Whenever the hypervisor receives such a memory location, decision 480 branches to the "yes" branch which loops back to receive the memory location and store the location along with the partition identifier in collaborative memory locations 475. When the hypervisor is not receiving another memory location corresponding to a shared data structure, then the "no" branch is taken whereupon, at predefined process 490, the hypervisor performs its functions including its Advanced Memory Sharing functions which uses the data stored in the shared data structures to identify a memory stress associated with each of the partitions and allocate (or re-allocate) the memory pool amongst the partitions based on their respective amounts of memory stress. Hypervisor processing thereafter ends at 495 (e.g., when the system is shutdown, etc.).

Figure 5:
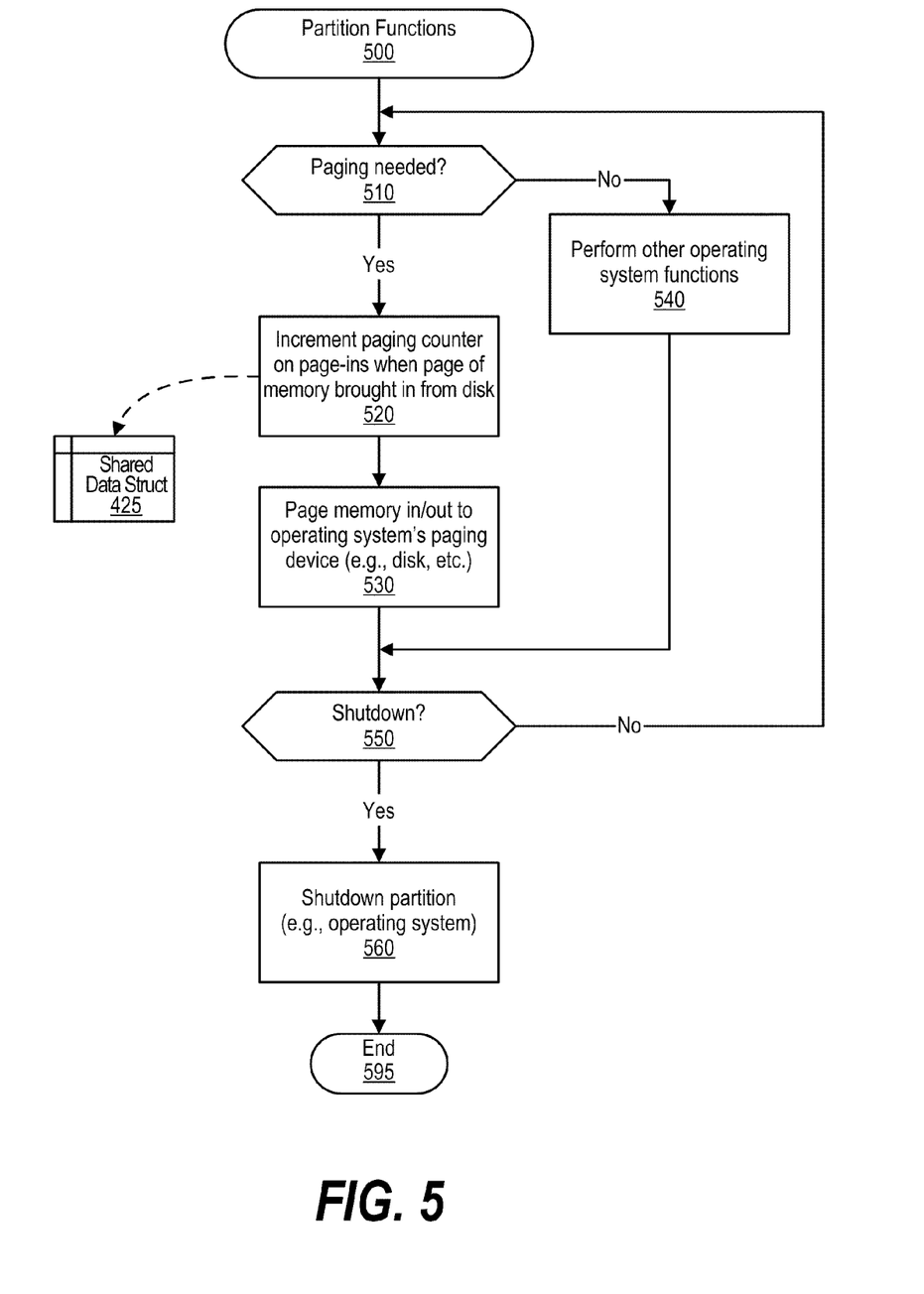
FIG. 5 is a flowchart showing steps taken by the partitions, such as guest operating systems, to update the shared data structure.

FIG. 5 is a flowchart showing steps taken by the partitions, such as guest operating systems, to update the shared data structure. Partition (e.g. guest operating system) functions are shown commencing at 500. A determination is made as to whether a local memory related operation is needed. In this case, the local memory related operation is a determination as to whether local paging is needed (decision 510). If local paging is needed, then decision 510 branches to the "yes" branch whereupon, at step 520, a paging counter maintained in shared data structure 425 is incremented. In one embodiment, the counter is incremented when a page of memory is brought in (paged in) from disk. At step 530, the local memory related operation is performed. In this case, the local memory related operation is the partition paging memory out/in to/from another memory (e.g., a disk, nonvolatile storage, etc.). Returning to decision 510, if the local memory related operation is not needed, then decision 510 branches to the "no" branch whereupon, at step 540, other partition (e.g., guest operating system) functions are performed.

A determination is made as to whether the partition is being shutdown (decision 550). If the partition is not being shutdown, then decision 550 branches to the "no" branch which loops back to continue performing partition functions, including any local memory related operations. When the partition is being shutdown, then decision 550 branches to the "yes" branch whereupon, at step 560, the partition is shutdown. In one embodiment, shutdown operations also include de-allocating shared data structure 425 and notifying the hypervisor so that the hypervisor can remove the entry for the partition and the shared data structure from its collaborative memory locations. Partition processing thereafter ends at 595.

Figure 6:
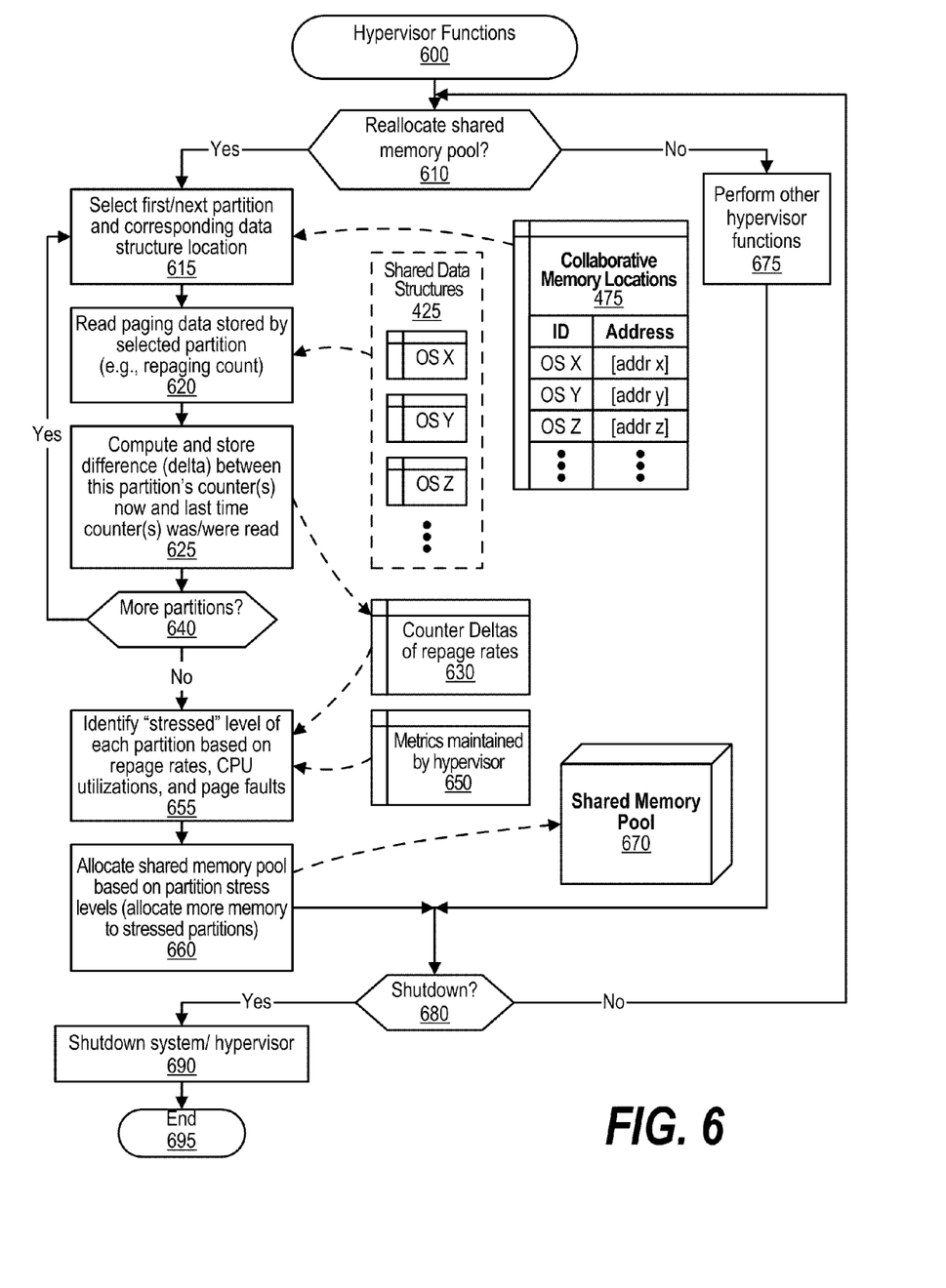
FIG. 6 is a flowchart showing details of how the hypervisor retrieves the data from the various partitions' shared data structures and uses the information to identify the memory needs of the various partitions in order to allocate memory from a shared memory pool.

FIG. 6 is a flowchart showing details of how the hypervisor retrieves the data from the various partitions' shared data structures and uses the information to identify the memory needs of the various partitions in order to allocate memory from a shared memory pool. Processing commences at 600 whereupon a determination is made as to whether the hypervisor is reallocating the shared memory pool amongst the partitions that are being managed by the hypervisor (decision 610). If the hypervisor is reallocating the shared memory pool amongst the partitions, then decision 610 branches to the "yes" branch whereupon, at step 615 the first partition and the memory location of its shared data structure are retrieved from collaborative memory locations 475. At step 620, the hypervisor reads the memory related metric from the shared data structure 425 corresponding to the selected partition (e.g., the paging count if the memory related metric is a local paging event, etc.). At step 625, the hypervisor computes and stores a difference (delta) between this partitions current data (counters) and the last time these counters were read and stores the counter delta in memory area 630. A determination is made as to whether there are more partitions listed in collaborative memory locations 475 (decision 640). If there are more partitions listed, then decision 640 branches to the "yes" branch which loops back to select the next partition in the list, read its local memory related metrics, and compute its differences (deltas). This looping continues until all of the partitions listed in collaborative memory locations 475 have been processed.

When all of the partitions listed in collaborative memory locations 475 have been processed and deltas have been computed for each of the partitions, then decision 640 branches to the "no" branch whereupon, at step 655, the hypervisor identifies a memory stress associated with each of the partitions that are being managed by the hypervisor. This identification of memory stress is based, in full or in part, on the local memory metrics retrieved from the shared data structures. In one embodiment, the memory stress is based on both the local memory metrics as well as memory metrics available to the hypervisor without use of the shared data structures (e.g., CPU utilization rates, page faults, etc.). At step 660, the hypervisor allocates shared memory pool 670 based on the identified memory stress that is associated with each of the partitions with more memory being allocated to those partitions that are identified as memory stressed and less memory allocated to those partitions that are not identified as memory stressed.

Returning to decision 610, if the hypervisor is not currently reallocating the shared memory pool, then decision 610 branches to the "no" branch whereupon, at step 675, other hypervisor functions are performed. A determination is made as to whether the system (hypervisor) is being shutdown (decision 680). If the system is not being shutdown, then decision 680 branches to the "no" branch whereupon hypervisor operations continue. However, if the system is being shutdown, then decision 680 branches to the "yes" branch whereupon, at step 690, the hypervisor (system) is shutdown and processing terminates at 695.

One of the intended implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    allocating, by a hypervisor executing on one or more processors, a shared memory pool amongst a plurality of partitions, wherein each of the partitions is being managed by the hypervisor and wherein the shared memory pool is accessible by one or more of the processors;
    allocating, by each of the plurality of partitions, one of a plurality of shared data structures stored in a memory area accessible by at least one of the processors, each of the plurality of shared data structures corresponding to a different one of the plurality of partitions;
    sending, by each of the plurality of partitions, an address of their corresponding one of the plurality of shared data structures to the hypervisor;
    retrieving, by the hypervisor, a plurality of memory related metrics from the plurality of shared data structures, wherein each of the memory related metrics corresponds with a usage of the shared memory pool allocated to the corresponding partition;
    identifying, by the hypervisor, a memory stress associated with each of the plurality of partitions, wherein the identification is based in part on the memory related metrics retrieved from the plurality of shared data structures corresponding to each of the plurality of partitions; and
    re-allocating, by the hypervisor, the shared memory pool amongst the plurality of partitions based on the identified memory stress of the plurality of partitions.

2. The method of claim 1 further comprising:
    receiving, by the hypervisor, the addresses of the shared data structures corresponding to each of the partitions; and
    retaining, by the hypervisor, the addresses of the shared data structures and the corresponding partition.

3. The method of claim 1 further comprising:
    during execution of the plurality of partitions, performing one or more local paging events by one or more of the plurality of partitions; and
    updating, by the one or more of the plurality of partitions, the shared data structures corresponding to the partitions that performed the local paging events, wherein the updating includes writing one or more values that indicate the performance of the one or more local paging events by the one or more partitions.

4. The method of claim 3 further comprising:
    retrieving, by the hypervisor, the values written to the shared data structures by the partitions;
    computing a difference (delta) between the retrieved values and a previous reading of the values, wherein a difference corresponds to each of the partitions; and
    identifying the memory stress corresponding to each of the partitions based on the computed differences.

5. The method of claim 1 wherein the identification of the memory stress associated with each of the partitions is based upon the memory related metrics retrieved from the shared data structures, one or more CPU utilization values, and one or more page fault values.

6. The method of claim 5 wherein at least one of the partitions is a guest operating system and wherein the memory related metrics include a repaging count.

7. An information handling system comprising:
one or more processors;
a memory accessible by at least one of the processors;
a nonvolatile storage medium accessible by at least one of the processors;
a set of instructions stored in the memory and executed by at least one of the processors in order to perform actions of:
  allocating, by a hypervisor, a shared memory pool amongst a plurality of partitions, wherein each of the partitions is being managed by the hypervisor;
  allocating, by each of the plurality of partitions, one of a plurality of shared data structures stored in a memory area accessible by at least one of the processors, each of the plurality of shared data structures corresponding to a different one of the plurality of partitions;
  sending, by each of the plurality of partitions, an address of their corresponding one of the plurality of shared data structures to the hypervisor;
  retrieving, by the hypervisor, a plurality of memory related metrics from the plurality of shared data structures, wherein each of the memory related metrics corresponds with a usage of the shared memory pool allocated to the corresponding partition;
  identifying, by the hypervisor, a memory stress associated with each of the plurality of partitions, wherein the identification is based in part on the memory related metrics retrieved from the plurality of shared data structures corresponding to each of the plurality of partitions; and
  re-allocating, by the hypervisor, the shared memory pool amongst the plurality of partitions based on the identified memory stress of the plurality of partitions.

8. The information handling system of claim 7 wherein the actions further comprise:
  receiving, by the hypervisor, the addresses of the shared data structures corresponding to each of the partitions; and
  retaining, by the hypervisor, the addresses of the shared data structures and the corresponding partition.

9. The information handling system of claim 7 wherein the actions further comprise:
  during execution of the plurality of partitions, performing one or more local paging events by one or more of the plurality of partitions; and
  updating, by the one or more of the plurality of partitions, the shared data structures corresponding to the partitions that performed the local paging events, wherein the updating includes writing one or more values that indicate the performance of the one or more local paging events by the one or more partitions.

10. The information handling system of claim 9 wherein the actions further comprise:
  retrieving, by the hypervisor, the values written to the shared data structures by the partitions;
  computing a difference (delta) between the retrieved values and a previous reading of the values, wherein a difference corresponds to each of the partitions; and
  identifying the memory stress corresponding to each of the partitions based on the computed differences.

11. The information handling system of claim 7 wherein the identification of the memory stress associated with each of the partitions is based upon the memory related metrics retrieved from the shared data structures, one or more CPU utilization values, and one or more page fault values.

12. The information handling system of claim 11 wherein at least one of the partitions is a guest operating system and wherein the memory related metrics include a repaging count.

13. A computer program product stored in computer memory, comprising functional descriptive material that, when executed by an information handling system, causes the information handling system to perform actions comprising:
  allocating, by a hypervisor, a shared memory pool amongst a plurality of partitions, wherein each of the partitions is being managed by the hypervisor;
  allocating, by each of the plurality of partitions, one of a plurality of shared data structures stored in a memory area accessible by at least one of the processors, each of the plurality of shared data structures corresponding to a different one of the plurality of partitions;
  sending, by each of the plurality of partitions, an address of their corresponding one of the plurality of shared data structures to the hypervisor;
  retrieving, by the hypervisor, a plurality of memory related metrics from the plurality of shared data structures, wherein each of the memory related metrics corresponds with a usage of the shared memory pool allocated to the corresponding partition;
  identifying, by the hypervisor, a memory stress associated with each of the plurality of partitions, wherein the identification is based in part on the memory related metrics retrieved from the plurality of shared data structures corresponding to each of the plurality of partitions; and
  re-allocating, by the hypervisor, the shared memory pool amongst the plurality of partitions based on the identified memory stress of the plurality of partitions.

14. The computer program product of claim 13 wherein the actions further comprise:
  receiving, by the hypervisor, the addresses of the shared data structures corresponding to each of the partitions; and
  retaining, by the hypervisor, the addresses of the shared data structures and the corresponding partition.

15. The computer program product of claim 13 wherein the actions further comprise:
  during execution of the plurality of partitions, performing one or more local paging events by one or more of the plurality of partitions; and
  updating, by the one or more of the plurality of partitions, the shared data structures corresponding to the partitions that performed the local paging events, wherein the updating includes writing one or more values that indicate the performance of the one or more local paging events by the one or more partitions.

16. The computer program product of claim 15 wherein the actions further comprise:
  retrieving, by the hypervisor, the values written to the shared data structures by the partitions;
  computing a difference (delta) between the retrieved values and a previous reading of the values, wherein a difference corresponds to each of the partitions; and
  identifying the memory stress corresponding to each of the partitions based on the computed differences.

17. The computer program product of claim 13 wherein the identification of the memory stress associated with each of the partitions is based upon the memory related metrics retrieved from the shared data structures, one or more CPU utilization values, and one or more page fault values, wherein at least one of the partitions is a guest operating system and wherein the memory related metrics include a repaging count.

* * * * *